United States Patent
Bohra et al.

(10) Patent No.: US 11,216,801 B2
(45) Date of Patent: Jan. 4, 2022

(54) VOICE CONTROLLED SYSTEMS AND METHODS FOR ONBOARDING USERS AND EXCHANGING DATA

(71) Applicant: Mastercard International Incorporated, Purchase, NY (US)

(72) Inventors: Ninju Bohra, Wildwood, MO (US); Matthew S. Smith, Troy, MO (US); Jacqueline Suzanne Welsh-Holder, Fenton, MO (US); Anthony Walker, St. Louis, MO (US); Moon Seon Ok, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 665 days.

(21) Appl. No.: 15/801,130

(22) Filed: Nov. 1, 2017

(65) Prior Publication Data

US 2019/0130390 A1    May 2, 2019

(51) Int. Cl.
| | |
|---|---|
| *G06Q 20/36* | (2012.01) |
| *G06F 3/16* | (2006.01) |
| *G06Q 20/40* | (2012.01) |
| *G06Q 20/32* | (2012.01) |

(52) U.S. Cl.
CPC ........... *G06Q 20/363* (2013.01); *G06F 3/167* (2013.01); *G06Q 20/3272* (2013.01); *G06Q 20/40145* (2013.01)

(58) Field of Classification Search
CPC ............. G06Q 20/363; G06Q 20/3272; G06Q 20/40145; G06F 3/167
See application file for complete search history.

(56) References Cited

U.S. PATENT DOCUMENTS

| | | | |
|---|---|---|---|
| 7,499,888 B1 | 3/2009 | Tu et al. | |
| 8,275,097 B2* | 9/2012 | Tonini | G06Q 20/325 379/88.02 |
| 8,768,709 B1* | 7/2014 | McIntosh | H04M 3/42136 704/273 |

(Continued)

OTHER PUBLICATIONS

Jyotsana Goyal, Design of improved algorithm for mobile payments using biometrics, Department of computer science & Engineering, Suresh Gyan Vihar University, Mahal, Jagatpura, Jaipur, Dec. 2013, pp. 9-56 (Year: 2013).*

*Primary Examiner* — Christopher Bridges
*Assistant Examiner* — Tony P Kanaan
(74) *Attorney, Agent, or Firm* — Armstrong Teasdale LLP

(57) ABSTRACT

A voice controlled (VC) system for onboarding users and exchanging data in real-time over a network is provided. The VC system includes at least one data controller (DC) computing device in communication with at least one voice controlled (VC) computing device. The DC computing device is configured to receive transaction data and voice controlled (VC) data, parse the transaction data and the VC data, and perform a look up in a database using the parsed transaction data and VC data. The VC system is also configured to compare the transaction data and the VC data to stored data, and verify the transaction data and the VC data by matching the transaction data and the VC data to the stored data. The VC system is further configured to generate a message based on the matched data, and transmit the message to a merchant associated with the verified data.

21 Claims, 6 Drawing Sheets

(56) References Cited

U.S. PATENT DOCUMENTS

| | | | |
|---|---|---|---|
| 9,236,052 B2* | 1/2016 | Timem | G06F 21/6209 |
| 9,530,136 B1* | 12/2016 | McIntosh | G10L 17/00 |
| 9,674,353 B1* | 6/2017 | McIntosh | G10L 15/22 |
| 9,940,934 B2* | 4/2018 | Sachdev | G10L 17/06 |
| 9,978,065 B2* | 5/2018 | Li | G10L 17/22 |
| 10,019,713 B1* | 7/2018 | McIntosh | G06Q 20/409 |
| 10,044,710 B2* | 8/2018 | Yap | G06Q 20/401 |
| 10,423,958 B2* | 9/2019 | Wang | G10L 17/22 |
| 10,438,204 B2* | 10/2019 | Bruno | G06Q 20/40145 |
| 10,956,907 B2* | 3/2021 | Parnell | G06Q 20/40145 |
| 2003/0069844 A1 | 4/2003 | Koren | |
| 2005/0075985 A1* | 4/2005 | Cartmell | G06Q 20/12 |
| | | | 705/67 |
| 2006/0023694 A1* | 2/2006 | Wilson | H04M 15/56 |
| | | | 370/352 |
| 2006/0026108 A1 | 2/2006 | Wilson et al. | |
| 2008/0040262 A1* | 2/2008 | D K | G06F 21/35 |
| | | | 705/39 |
| 2013/0232073 A1* | 9/2013 | Sheets | H04L 9/3231 |
| | | | 705/44 |
| 2014/0372128 A1* | 12/2014 | Sheets | G06Q 20/20 |
| | | | 704/273 |
| 2014/0379342 A1* | 12/2014 | Li | G06Q 20/40145 |
| | | | 704/246 |
| 2015/0081545 A1* | 3/2015 | Gissler | G06Q 20/322 |
| | | | 705/44 |
| 2015/0081548 A1* | 3/2015 | Robinett | G06Q 20/32 |
| | | | 705/44 |
| 2015/0088746 A1* | 3/2015 | Hoffman | G06Q 20/40145 |
| | | | 705/44 |
| 2015/0193776 A1* | 7/2015 | Douglas | G06Q 20/40145 |
| | | | 705/16 |
| 2015/0302857 A1 | 10/2015 | Kamada | |
| 2016/0042349 A1* | 2/2016 | Broman | G06Q 20/40 |
| | | | 705/44 |
| 2017/0270530 A1* | 9/2017 | Sheets | G06Q 20/20 |
| 2017/0371620 A1* | 12/2017 | Zhou | G06F 3/167 |
| 2018/0351929 A1* | 12/2018 | Kohli | G06Q 20/363 |

* cited by examiner

US 11,216,801 B2

VOICE CONTROLLED SYSTEMS AND METHODS FOR ONBOARDING USERS AND EXCHANGING DATA

BACKGROUND

This disclosure relates generally to voice controlled systems, and more specifically to onboarding users and exchanging data in real-time over a network using at least one voice controlled (VC) computing device.

As technology develops (e.g., processing capability and speeds increase, connectivity increases), the "Internet of Things" (IoT) has expanded. The Internet of Things refers generally to an interconnectivity to the Internet of previously unconnected items, such as watches, refrigerators, automobiles, speakers, microphones, and other devices that used to be unconnected to the Internet. The Internet of Things enables new functionality for these items, which, in some cases, can make the lives of users more efficient and more enjoyable. For example, voice controlled computing devices with Internet connectivity functionality may enable users to access a variety of websites, get information from the Internet, and even control other devices (e.g., thermostats, lights, televisions, or the like) that may be connected to the voice controlled computing devices. This can be accomplished with only the input of the users' voice command. These voice controlled computing devices have many benefits including ease of use and variety of uses. However, there are still many limitations with respect to these voice controlled computing devices. For example, authenticating a user of the voice controlled computing device as being a specific user can be difficult.

Thus, these voice controlled computing devices may not be well suited for certain tasks where the user needs to be authenticated. Accordingly, it is desirable to have a voice controlled computing device that includes user authentication capabilities such that users can be properly and securely onboarded.

BRIEF DESCRIPTION OF THE DISCLOSURE

In one aspect, a voice controlled (VC) system for onboarding users and exchanging data in real-time over a network is provided. The VC system includes at least one data controller (DC) computing device in communication with at least voice controlled (VC) computing device. The DC computing device includes a processor communicatively coupled to a memory. The VC system is configured to receive transaction data and voice controlled (VC) data, wherein the transaction data and the VC data include at least an account identifier, a user identifier, a voice controlled (VC) computing device identifier, a digital wallet identifier, a name of a merchant, and a payment amount. The VC system is also configured to parse the transaction data and the VC data to retrieve the account identifier, the user identifier, the VC computing device identifier, the digital wallet identifier, and the name of the merchant (or the merchant identifier), perform a look up in a database using the received name of the merchant (or the received merchant identifier) and the account identifier, and compare i) the received name of the merchant to a list of stored names of merchants and ii) the received account identifier to a list of stored account identifiers. The VC system is further configured to verify the received name of the merchant and the received account identifier by matching i) the received name of the merchant to a corresponding stored name of the merchant from the list stored name merchants and ii) the received account identifier to a corresponding stored account identifier from the list of stored account identifiers, generate a message including the verified received name of the merchant, the verified received account identifier, the digital wallet identifier, and the payment amount, and transmit the message to a merchant associated with the verified received name of the merchant.

In another aspect, a computer-implemented method for onboarding users and exchanging data in real-time over a network is provided. The method is performed using at least one data controller (DC) computing device in communication with at least voice controlled (VC) computing device. The DC computing device includes at least one processor in communication with at least one memory device. The method includes receiving transaction data and voice controlled (VC) data, wherein the transaction data and the VC data include at least an account identifier, a user identifier, a voice controlled (VC) computing device identifier, a digital wallet identifier, a name of a merchant (or a merchant identifier), and a payment amount. The method also includes parsing the transaction data and the VC data to retrieve the account identifier, the user identifier, the VC computing device identifier, the digital wallet identifier, and the name of the merchant (or the merchant identifier), performing a look up in a database using the received name of the merchant (or the received merchant identifier) and the account identifier, and comparing i) the received name of the merchant to a list of stored names of merchants and ii) the received account identifier to a list of stored account identifiers. The method further includes matching i) the name of the merchant to a corresponding stored name of the merchant and ii) the account identifier to a corresponding stored account identifier, generating a message including the name of the merchant, the account identifier, the digital wallet identifier, and the payment amount, and transmitting the message to a merchant associated with the name of the merchant verifying the received name of the merchant and the received account identifier by matching i) the received name of the merchant to a corresponding stored name of the merchant from the list stored name merchants and ii) the received account identifier to a corresponding stored account identifier from the list of stored account identifiers, generating a message including the verified received name of the merchant, the verified received account identifier, the digital wallet identifier, and the payment amount, and transmitting the message to a merchant associated with the verified received name of the merchant.

In yet another aspect, a non-transitory computer readable medium that includes executable instructions for onboarding users and exchanging data in real-time over a network is provided. When the computer executable instructions are executed by at least one data controller (DC) computing device in communication with at least voice controlled (VC) computing device. The DC computing device includes at least one processor in communication with at least one memory device, the computer executable instructions cause the DC computing device to receive transaction data and voice controlled (VC) data, wherein the transaction data and the VC data include at least an account identifier, a user identifier, a voice controlled (VC) computing device identifier, a digital wallet identifier, a name of a merchant (or a merchant identifier), and a payment amount. The computer executable instructions also cause the DC computing device to parse the transaction data and the VC data to retrieve the account identifier, the user identifier, the VC computing device identifier, the digital wallet identifier, and the name of the merchant (or the merchant identifier), perform a look up in a database using the name of the merchant and the account identifier, and compare i) the name of the merchant to a corresponding stored name of the merchant and ii) the account identifier to a corresponding stored account identifier perform a look up in a database using the received name of the merchant (or the received merchant identifier) and the account identifier, and compare i) the received name of the merchant to a list of stored names of merchants and ii) the received account identifier to a list of stored account identifiers. The computer executable instructions further cause the DC computing device to verify the received name of the merchant and the received account identifier by matching i) the received name of the merchant to a corresponding stored name of the merchant from the list stored name merchants and ii) the received account identifier to a corresponding stored account identifier from the list of stored account identifiers, generate a message including the verified received name of the merchant, the verified received account identifier, the digital wallet identifier, and the payment amount, and transmit the message to a merchant associated with the verified received name of the merchant.

BRIEF DESCRIPTION OF THE DRAWINGS

FIG. 1 is a simplified block diagram of an example voice controlled (VC) system used for onboarding users and exchanging data in real-time over a network using at least one voice controlled (VC) computing device in accordance with an example embodiment of the present disclosure.

FIG. 2 is a schematic diagram illustrating an example multi-party payment processing system for enabling payment-by-card transactions.

FIG. 3 illustrates an example configuration of user system, such as a client system shown in FIG. 1, in accordance with an embodiment of the present disclosure.

FIG. 4 illustrates an example configuration of the server system shown in FIG. 1, in accordance with an embodiment of the present disclosure.

FIG. 5 is a flow diagram illustrating an example process for onboarding users and exchanging data in real-time over a network using at least one VC computing device, which may be implemented utilizing the system shown in FIG. 1.

FIG. 6 shows a diagram of components of an example computing device that may be used in the VC system shown in FIG. 1 to onboard users and exchange data in real-time over a network using at least one VC computing device.

Figure 1:
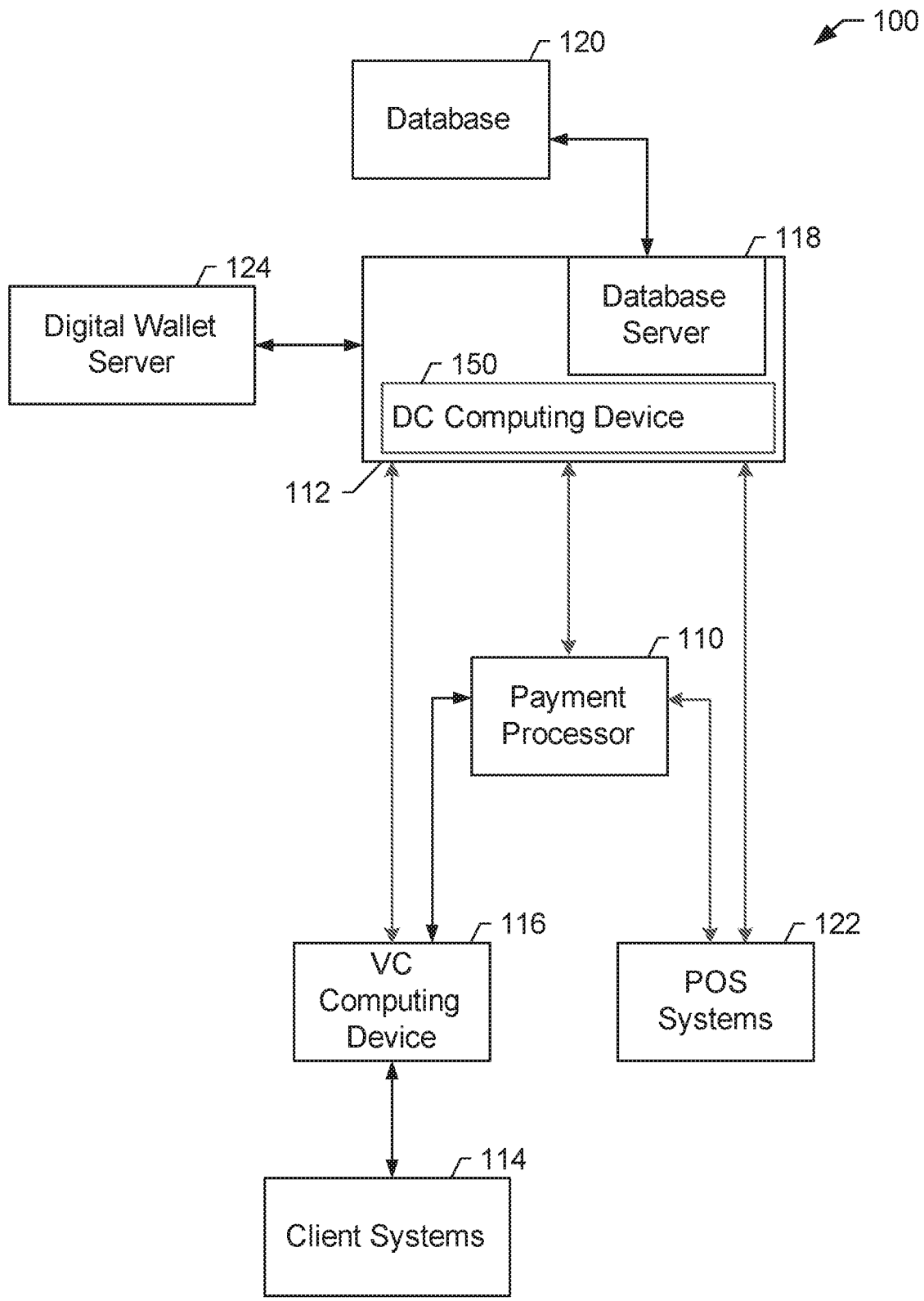
FIGS. 1-6 show example embodiments of the systems and methods described herein.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as being applied to an example embodiment, namely, methods and systems that utilize a voice controlled (VC) system for onboarding users and exchanging data in real-time for processing electronic payment transactions over a network. More specifically, the systems and methods described herein are directed to onboarding users into the VC system so that the user can make electronic payments to a merchant (e.g., a payee) using a voice controlled (VC) computing device. To do so, the user (e.g., a payor) transmits to the VC system user information associated with the merchant, such as merchant name, user's merchant number, and/or other information need to set up the merchant within the VC system. Once the VC system receives the merchant information, the VC system generates a merchant profile associated with the user within the VC system. As defined herein, real-time relates to the VC system processing data within a short period of time or as the user is performing the tasks with a computing device (e.g., milliseconds to seconds, or possibly minutes depending upon the task) so that the data output and/or input is available virtually immediately.

The VC system described herein includes at least one data controller (DC) computing device. The DC computing device may be in communication with at least one merchant computing device (e.g., a point-of-sale (POS) terminal, a smartphone, tablet, or any other computing device able to communicate with the DC computing device), a payment processor, at least one issuer bank computing device, at least one acquirer bank computing device, and at least one voice controlled (VC) computing device. The VC computing device has a user interface that enables the user to make purchases and pay bills directly through the user interface. The VC computing device may be, for example, an Amazon Echo® (Amazon and Echo are registered trademarks of Amazon.com Incorporated located in Seattle, Wash.), Google® Home™ (Google is a trademark of Google Incorporated located in Mountain View, Calif.), or other devices that are capable of receiving input via voice recognition.

The DC computing device includes a processor in communication with a memory. The DC computing device is further in communication with at least one database for storing information, such as transaction data and voice controlled (VC) data. The transaction data may include payment transactions initiated by a user using a VC computing device associated with a particular transaction processing network. The transaction data may also include, among other data points, data associated with the user and a merchant involved in the payment transaction. For example, transaction data may include one or more of: a user account data (e.g., a primary account number (PAN)), user biometric data, a merchant identifier, a merchant computing device identifier, a transaction amount, a time and date of the transaction, data descriptive of the purchase, a location of the transaction, a merchant IP address, an authorization message, and/or other data associated with the payment transaction.

The VC data may include VC computing device information, such as a VC computing device identifier, a VC computing device name, at least one VC command, a VC IP address, and other data associated with the VC computing device. The VC data may also include information of the user and the merchant that may engage in at least one transaction. Such information may include a user identifier, a merchant identifier, a merchant IP address, a user account data, a user biometric data, a registration request message, a digital wallet identifier, and other data that may enable the DC computing device to onboard the VC computing device and the user in a voice controlled (VC) service.

In some embodiments, the VC data and/or transaction data are anonymized and aggregated (e.g., by the VC computing device) prior to receipt by the DC computing device (i.e., no personally identifiable information (PII) is received by the DC computing device). In other embodiments, the DC computing device may be configured to receive the VC data and/or transaction data that is not yet anonymized and/or aggregated, and thus may be configured to anonymize and aggregate the VC data and/or transaction data. In such embodiments, any PII received by the DC computing device is received and processed in an encrypted format, or is received with the consent of individuals with which the PII is associated. In situations in which the systems discussed herein collect personal information about individuals including users and/or merchants, or may make use of such personal information, individuals may be provided with an opportunity to control whether such information is collected or to control whether and/or how such information is used. In addition, certain data may be processed in one or more ways before it is stored or used, so that personally identifiable information is removed.

In the example embodiment, the DC computing device is configured to receive VC data from the VC computing device. The VC computing device generates the VC data at the time a user enrolls in the VC payment service provided by the DC computing device. The DC computing device is configured to provide the VC payment service to one or more users, one or more merchants, and one or more issuers. In the example embodiment, the user is enrolled in an electronic application, such as a digital wallet, before the DC computing device onboards the user and the VC computing device in the VC payment service. In other embodiments, the user may enroll in the digital wallet at the same time as the DC computing device onboards the user and the VC computing device in the VC payment service. The user may enroll in the digital wallet using a user computing device that is capable of accessing the Internet. The user computing device includes, but is not limited to, a desktop computer, a laptop computer, a personal digital assistant (PDA), a cellular phone, a smartphone, a tablet, a phablet, or other web-based connectable equipment. The user may also enroll in the digital wallet using the VC computing device.

In the example embodiment, the user downloads onto the VC computing device skill code snippets associated with the DC computing device. The user may download such skill code snippets from a virtual store (e.g., Amazon Skill Store). These skill code snippets enable the VC computing device to communicate with the DC computing device. More specifically, the skill code snippets enable the VC computing device to access the DC computing device Application Programming Interface (API) that runs the VC payment service. The skill code snippets also enable the VC computing device to access the DC computing device voice controlled (VC) code that executes on the VC computing device for allowing the VC computing device to interact and communicate with the DC computing device. After the user has downloaded the skill code snippets, the user may register along with the VC computing device in the VC payment service. The skill code snippets are configured to authenticate the user via machine learning programs. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other machine learning method.

The user initiates the registration process by activating the VC computing device which executes the skill code snippets on the VC computing device. In the example embodiment, the VC computing device is configured to activate by identifying or recognizing a predesignated spoken trigger word. For example, the user may say, "VC," and the VC computing device may reply, via a speaker, "How may I help you?" In alternative embodiments, the VC computing device is configured to activate by identifying a typed code and/or character (e.g., alphanumeric, alphabetic, numeric, symbols—either individually or in combination). In other embodiments, the VC computing device is configured to activate by any suitable means that enables the VC computing device to function, as described herein. Once the VC computing device activates, the skill code snippets may instruct the VC computing device to request the user to register for the VC payment service.

In the example embodiment, the user initiates the registration process by stating the name of the application. The user may state, "VC, add my digital wallet to the VC payment service." In response, the VC computing device may transmit, through the speaker, "Please provide your digital wallet username and password." The user may state, "My username is user123 and my password is 987654." The VC computing device is configured to receive the username and the password, and store the username and the password within a database in communication with the VC computing device. The user name and the password may also be referred to as a digital wallet user identifier. The VC computing may be configured to use the VC computing device voice recognition code to associate the voice of the user with the digital wallet user identifier. A voice fingerprint may be stored in one database for later use.

The VC computing device may associate the voice of the user with the digital wallet user identifier by assigning a voice identifier to the user's voice. By associating the voice of the user with the digital wallet user identifier, the VC computing device may authenticate the user as the legitimate user of the digital wallet in future uses of the digital wallet by the user. The VC computing device is further configured to generate a message including digital wallet information, such as the digital wallet user identifier and the voice identifier and transmit the message to the DC computing device. In alternative embodiments, the VC computing device captures other biometric data, besides the user's voice, to authenticate the user. Such biometric data may include, but is not limited to, a user's fingerprints, face, iris, or the like.

In the example embodiment, the DC computing device is in communication with a digital wallet server. The digital wallet server is configured to store digital wallet information associated with users of the digital wallet. In the example embodiment, the DC computing device may access the digital wallet server and perform a look up for the digital wallet user identifier to determine whether the digital wallet user identifier matches a stored digital wallet user identifier.

In alternative embodiments, the DC computing device may submit a request, including the digital wallet user identifier, to the digital wallet server. The digital wallet server performs the look up for the digital wallet user identifier and returns a response to the DC computing device. The response may include a match or a no match between the submitted digital user identifier and a stored digital wallet user identifier. In some embodiments, if the response includes a match, the DC computing device generates and transmits an authentication message to the VC computing device, as described in more detail below. In other embodiments, if the response includes a match, the DC computing device approves the registration of the user and the VC computing device, as described in more detail below.

However, if the response includes a no match, the DC computing device denies the registration of the user and the VC computing device, as described in more detail below.

In the example embodiment, if the DC computing device determines that the digital wallet user identifier matches a stored digital wallet user identifier, the DC computing device generates and transmits an authentication request message to the VC computing device. The authentication request message includes a request to generate a confirmation code. The confirmation code may include various characters, such as a numeric, an alphabetic, an alphanumeric, a symbol, and the like. Upon receiving the authentication message, the VC computing device generates the confirmation code and transmits the code to a user computing device onboarded in the VC computing device and associated with the user. In some embodiments, the confirmation code includes a request to read such characters. The user computing device receives the code and displays the code to the user, who then speaks the code to an audio input device (e.g., a microphone and/or speaker) in communication with the VC computing device. In other embodiments, the confirmation code includes a request to provide biometric data, such as a user's fingerprints, face, iris, or the like. The user computing device receives the code and displays the code to the user, who then provides the biometric data to a biometric reader (e.g., a fingerprint reader/scanner, a palm print reader/scanner, an iris reader/scanner, a retina reader/scanner, a profile scanner, or the like) in communication with the user computing device and/or the VC computing device. In yet other embodiments, the confirmation code includes a request to input written and/or typed information (e.g., enter a username and password, via a keyboard or a pad) into the user computing device and/or the VC computing device.

If the code spoken by the user and the code transmitted to the user computing device by the VC computing device match, the VC computing device authenticates the user, and transmits an authentication approval message to the DC computing device. Upon receiving the authentication approval message, the DC computing device approves the registration of the user and the VC computing device. If the code spoken by the user and the code transmitted to the user computing device by the VC computing device do not match, the VC computing device does not authenticate the user and transmits an authentication denial message to the DC computing device. Upon receiving the authentication denial message, the DC computing device denies the registration of the user and the VC computing device. Upon approval of the registration, the DC computing device transmits an approval message to the VC computing device. Once the VC computing device receives the approval message, the VC computing device transmits the approval message, via a speaker, to the user In alternative embodiments, if the DC computing device determines that the digital wallet user identifier matches a stored digital wallet user identifier, the DC computing device approves the registration of the user and the VC computing device, without requiring an authentication approval message from the VC computing device. Upon approval of the registration, the DC computing device transmits an approval message to the VC computing device. Once the VC computing device receives the approval message, the VC computing device transmits the approval message, via a speaker, to the user.

In the example embodiment, if the DC computing device determines that the digital wallet user identifier does not match a stored digital wallet user identifier, the DC computing device denies the registration of the user and the VC computing device, and transmits a denial message to the VC computing device. Upon receiving the denial message, the VC computing device transmits, via a speaker, the denial message to the user. In some embodiments, if the DC computing device determines that the digital wallet user identifier does not match a stored digital wallet user identifier, the DC computing device suspends the registration, and generates and transmits a resubmission message to the VC computing device. The resubmission message may include a request for the user to resubmit the digital wallet user identifier. Once the VC computing device receives the resubmission message, the VC computing device transmits, via a speaker, the resubmission message to the user, who may speak the digital wallet user identifier again.

After the DC computing device has onboarded the user and the VC computing device, the user may register account numbers associated with merchants in the VC payment service provided by the DC computing device, via the VC computing device. In the example embodiment, these merchants are generally payees, such as cable providers, utility providers, loan providers, and/or other merchants that the user may desire to make payments. In other embodiments, the user may register account numbers associated with the user, natural persons, and/or non-merchant entities that the user may desire to transfer funds.

The user initiates the registration of the account numbers by speaking, for example, a predesignated word is recognized by the VC computing device and the skill code snippets running on the VC computing device. For example, the user may begin the payee registration process by making a statement, such as "VC computing device, add digital wallet payee." In this embodiment, the term "Add payee" activates the VC computing device to begin the process. The VC computing device may transmit, through a speaker, a response, such as "Welcome to digital wallet. You can add a payee." The user in return may state, "Add payee Gas Provider X." The VC computing device captures and stores the name of the merchant, "Gas Provider X." Subsequently, the VC computing device transmits, through the speaker, a question, such as "What is your Gas Provider X account number?" The user may respond "33-026303-33." In the example embodiment, the VC computing device repeats the inputted information and requests to the user to confirm that the account number was properly onboarded to the VC computing device. The VC computing device is configured to receive the confirmation from the user prior to transmitting the name of the merchant and the account number to the DC computing device. Once the VC computing device receives the confirmation, the VC computing device transmits VC data, including the name of the merchant, digital wallet identifier, and the account number, to the DC computing device.

The DC computing device is configured to receive the VC data and parse the VC data to at least identify the name of the merchant, the digital wallet identifier, and the account number. The DC computing device is also configured to use the name of the merchant and the account number to verify that they are associated with the user identifier corresponding to the user and the account number is associated with the name of the merchant. The DC computing device performs a look up for the name of the merchant in a database that includes names of merchants that are registered in the VC payment service. The DC computing device compares the name of the merchant to the names of merchants registered for the service. In one embodiment, if, based on the comparison, the DC computing device matches the name of the merchant to a name of a merchant (or a merchant identifier) registered in the service, the DC computing device stores within a database the matched name of the merchant and transmits the account number to the merchant associated with the matched name of the merchant. In response, the merchant may transmit an approval message to the DC computing device if the account number matches an account number in the merchant's database. If the account number does not match, the merchant may transmit a denial message to the DC computing device.

If the DC computing device receives an approval message from the corresponding merchant, the DC computing device generates a confirmation code and transmits the confirmation code to the VC computing device. The VC computing device performs a look up for a user computing device identifier and transmits the confirmation code to a user computing device associated with the user computing device identifier. Subsequently, the user computing device displays the received confirmation code, which the user reads to the VC computing device. Conversely, if the DC computing device receives a denial message, the DC computing device may generate a message that may include the reason for denial (e.g., incorrect account number, incorrect merchant name, incorrect user name, or the like). In the example embodiment, the VC computing device receives the message and transmits, via the speaker, the reason for denial. For example, the VC computing device may transmit a message, such as "Gas Provider X was not added. Please enter the correct account number."

In another embodiment, if, based on the comparison, the DC computing device matches the name of the merchant to a name of a merchant (or a merchant identifier) registered in the service, the DC computing device accesses a merchant database where the DC computing device performs a look up for the account number. If the account number matches an account number in the merchant database, the DC computing device generates a confirmation code and transmits the confirmation code to the VC computing device. The VC computing device performs a look up for a user computing device identifier and transmits the confirmation to a user computing device associated with the user computing device identifier. Subsequently, the user computing device displays the received confirmation code, which the user reads to the VC computing device. Conversely, if the DC computing device does not match the account number to an account number in the merchant database, the DC computing device may generate a message that may include the reason for denial (e.g., incorrect account number, incorrect merchant name, incorrect user name, or the like). In the example embodiment, the VC computing device receives the message and transmits, via the speaker, the reason for denial. For example, the VC computing device may transmit a message, such as "Gas Provider X was not added. Please enter the correct account number."

Once the DC computing device has added and stored the merchant associated with the merchant name and the account number within the database in communication with the DC computing device, the DC computing device is able to process payment transactions. For example, a user may begin a payment transaction by making a predesignated statement, such as "VC computing device, make digital wallet payment." In this embodiment, the terms "Make" and "Payment" activate the VC computing device to begin the payment transaction process. The VC computing device may transmit through a speaker a response, such as "Welcome to digital wallet. You can make a payment." The user, in return, may state, "Make payment to Gas Provider X." The VC computing device captures the name of the merchant, "Gas Provider X." Subsequently, the VC computing device transmits through the speaker question, such as "How much do you want to pay to Gas Provider X?" The user may respond "58 dollars and 24 cents." In the example embodiment, the VC computing device repeats the inputted amount and requests the user to confirm that the amount of the payment is correct. The VC computing device may make a statement, such as "I heard the amount as 58 dollars and 24 cents. Is that correct?" If the user states "Yes," the VC computing device is configured to generate a message including VC data, such as the name of the merchant, the user identifier, the VC computing device identifier, the account number associated with the merchant, the digital wallet identifier, and the payment amount. Subsequently, the VC computing device transmits the VC data and transaction data to the DC computing device.

The DC computing device is configured to receive the transaction data and the VC data, and parse the transaction data and the VC data to at least identify the name of the merchant, the digital wallet identifier, and the account number. The DC computing device is also configured to use the name of the merchant and the account number to verify that they are associated with the user identifier corresponding to the user and the account number is associated with the merchant. The DC computing device performs a look up for the name of the merchant in a database that includes names of merchants that are registered in the VC payment service. The DC computing device compares the name of the merchant to the names of merchants registered in the service. In one embodiment, if, based on the comparison, the DC computing device matches the name of the merchant to a name of a merchant registered in the service (e.g., a name of a merchant stored in the database) and the account number matches a stored account number, the DC computing device generates a confirmation code and transmits the confirmation code to the VC computing device.

The VC computing device performs a look up for a user computing device identifier and transmits the confirmation code to a user computing device associated with the user computing device identifier. Subsequently, the user computing device displays the received confirmation code to the user and the user reads the code to the VC computing device. If the confirmation code read by the user matches the confirmation code received from the DC computing device, the VC computing device generates an approval message confirming that the confirmation code matched. The VC computing device is also configured to transmit the approval message to the DC computing device. The DC computing device receives the approval message and transmits the payment amount to the merchant. If the confirmation code read by the user does not match the confirmation code received from the DC computing device, the VC computing device may request the user to read the confirmation code again. In some embodiments, the VC computing device is configured to request to the user to re-read the confirmation code a predefined number of times before the VC computing device generates a denial message (e.g., a no matching confirmation code message) and transmits that message to the DC computing device. In other embodiments, the VC computing device is configured to request to the user to re-read the confirmation code an unlimited number of times.

Although the method of authenticating the user (e.g., payor) is described herein as using a confirmation code which is sent to the user's user computing device for subsequent input to the VC computing device, other methods of authenticating the user may also be performed. For example, biometric data from a user may be collected by the user's user computing device and/or the VC computing device to authenticate the user. Such biometric data may include, but is not limited to, a user's fingerprints, face, iris, or other type of biometric data that enables the VC system to authenticate the user.

The methods and systems described herein may be implemented using computer programming or engineering techniques including computer software, firmware, hardware, or any combination or subset thereof. As disclosed above, at least one technical problem with prior payment processing systems is that the systems require users to access merchants' websites and entering large amounts of information. The systems and methods described herein address this technical problem by enabling users to make payments in few seconds by having a short conversation with at least one VC computing device.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as computing devices in the form of mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited skill code snippets.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a simplified block diagram of an example voice controlled (VC) system 100 used for onboarding users and exchanging data in real-time over a network using at least one voice controlled (VC) computing device in accordance with one example embodiment of the present disclosure. VC system 100 may be implemented in the performance of payment-by-card transactions received as part of processing user transactions. In an example embodiment, VC system 100 is a payment processing system that includes a data controller (DC) computing device 150 configured to onboarding users and exchanging data in real-time over a network using voice controlled computing devices.

Figure 2:
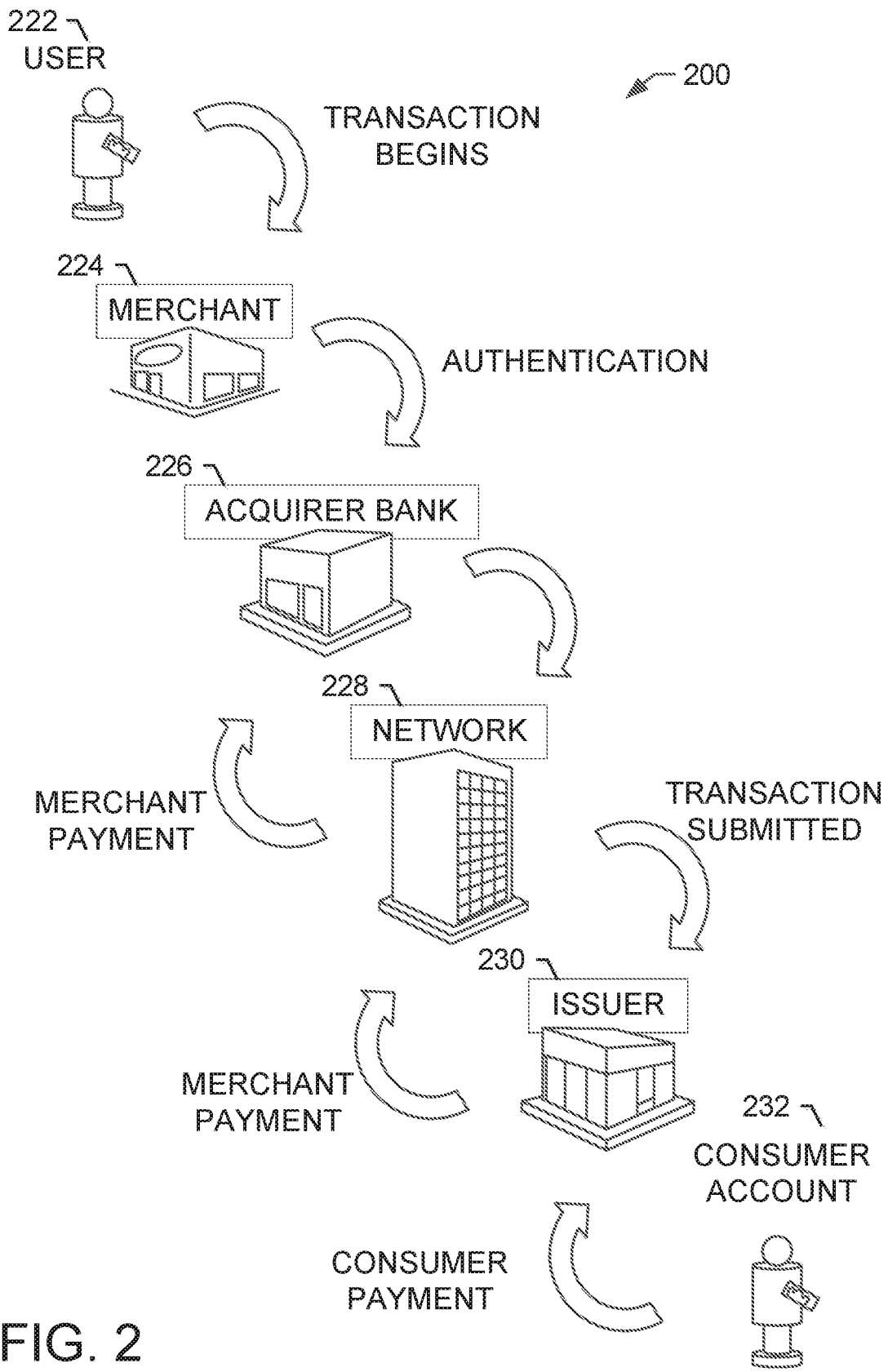

In the example embodiment, VC system 100 includes a server system 112, client systems 114, at least one voice controlled (VC) computing device 116, and digital wallet server 124. In some embodiments, client systems 114 include computing devices configured to implement a web browser or a software application, which enables client systems 114 to access server system 112 using the Internet. Client systems 114 may be communicatively coupled to the Internet through many interfaces including, but is not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 114 include any device capable of accessing the Internet including, but is not limited to, a desktop computer, a laptop computer, a personal digital assistant (PDA), a cellular phone, a smartphone, a tablet, a phablet, or other web-based connectable equipment. In the example embodiment, client systems 114 may be computing devices associated with one of user 222, merchant 224, merchant/acquirer bank 226, and/or issuer bank 230, as illustrated in FIG. 2. At least one client system 114 is in communication with VC computing device 116. The at least one client system 114 and VC computing device 116 are associated with user 222.

In one embodiment, server system 112 includes a database server 118 that is communicatively coupled to a database 120 for storing data. In an exemplary embodiment, database 120 stores transaction information from a plurality of users 222 and/or merchants 224 and paths based on the individual transactions. According to the exemplary embodiment, database 120 is disposed remotely from server system 112. In other embodiments, database 120 is decentralized, or may be a portion of server system 112. In the exemplary embodiment, an operator (not shown) is able to access database 120 through client systems 114 and/or digital wallet server 124 by logging onto server system 112. In the example embodiment, server system 112 may be associated with payment processor 110. Payment processor may be associated with interchange network 228 (shown in FIG. 2).

VC system 100 may further include one or more point-of-sale (POS) systems 122 that are communicatively coupled with server system 112. POS systems 122 may be associated with, for example, merchants 224, and are communicatively coupled with server system 112 through payment processing system 200 (shown in FIG. 2). POS systems 122 may include, without limitation, machines that accept card swipes, online payment portals, digital wallet payments, or stored payment card numbers for recurring transactions.

In the example embodiment, server system 112 is associated with a financial transaction interchange network, such as interchange network 228 and is also referred to as an interchange computer system. In some embodiments, server system 112 is used for processing transaction data and analyzing such data to enroll user 222 in a voice controlled (VC) service and enable user 222 make payments using VC computing device 116. In one embodiment, at least one of client system 114 and VC computing device 116 include a computer system associated with an issuer of a transaction payment card. Accordingly, server system 112, client systems 114, and VC computing device 116 may be utilized to process transaction data relating to purchases and payments user 222 makes utilizing a transaction card processed by interchange network 228 and issued by the associated issuer bank 230. In the exemplary embodiment, at least one client system 114 and at least one VC computing device 116 may be associated with user 222 seeking to register, access information, or process a transaction with at least one of interchange network 228, issuer bank 230, and/or merchant 224. In addition, client systems 114 or POS systems 122 may include individual point-of-sale (POS) terminals (not shown) associated with merchant 224 and used for processing payment transactions.

In the example embodiment, DC computing device 150 is communicatively coupled to digital wallet server 124 via interchange network 228. DC computing device 150 is configured to receive VC data from VC computing device 116. The VC data may include VC computing device 116 information, such as a VC computing device identifier, a VC computing device name, at least one VC command, a VC IP address, and other data associated with VC computing device 116. The VC data may also include information of user 222 and merchant 224 that may engage in at least one transaction. Such information may include a user identifier, the merchant identifier, a merchant IP address, a user account data, a user biometric data, a registration request message, a digital wallet identifier, and other data that may enable DC computing device 150 to onboard VC computing device 116 and user 222 in the VC payment service.

In the example embodiment, VC computing device 116 generates the VC data at the time a user enrolls in the VC payment service provided by DC computing device 150. DC computing device 150 is configured to provide the VC payment service to one or more users 222, one or more merchants 224, and one or more issuer banks 230. In the example embodiment, user 222 is enrolled in an electronic application, such as a digital wallet, before DC computing device 150 onboards user 222 and VC computing device 116 in the VC payment service. In other embodiments, the user may enroll in the digital wallet at the same time as the DC computing device onboards the user and the VC computing device in the VC payment service. User 222 may enroll in the digital wallet using a user computing device, such as client system 114, that is capable of accessing the Internet. The user computing device includes, but is not limited to, a desktop computer, a laptop computer, a personal digital assistant (PDA), a cellular phone, a smartphone, a tablet, a phablet, or other web-based connectable equipment. User 222 may also enroll in the digital wallet using VC computing device 116.

In the example embodiment, user 222 downloads onto VC computing device 116 skill code snippets associated with DC computing device 150. User 222 may download such skill code snippets from a virtual store (e.g., Amazon Skill Store). These skill code snippets enable VC computing device 116 to communicate with DC computing device 150. After user has downloaded the skill code snippets, user 222 may register along with VC computing device 116 in the VC payment service provided by DC computing device 150. User 222 initiates the registration process by providing to VC computing device 116 user's 222 digital wallet information (e.g., digital wallet user identifier). VC computing device 116 transmits user's 222 digital wallet information to DC computing device 150. DC computing device 150 is in communication with a digital wallet server 124. Digital wallet server 124 is configured to store digital wallet information associated with users of the digital wallet. In the example embodiment, DC computing device 150 may access digital wallet server 124 and perform a look up for the digital wallet user identifier to determine whether the digital wallet user identifier matches a stored digital wallet user identifier.

In alternative embodiments, DC computing device 150 may submit a request, including the digital wallet user identifier, to digital wallet server 124. Digital wallet server 124 performs the look up for the digital wallet user identifier and returns a response to DC computing device 150. The response may include a match or a no match between the submitted digital user identifier and a stored digital wallet user identifier. In some embodiments, if the response includes a match, DC computing device 150 generates and transmits an authentication message to VC computing device 116, as described in more detail below. In other embodiments, if the response includes a match, DC computing device 150 approves the registration of user 222 and VC computing device 116, as described in more detail below. However, if the response includes a no match, DC computing device 150 denies the registration of user 222 and VC computing device 116, as described in more detail below.

In the example embodiment, if DC computing device 150 determines that the digital wallet user identifier matches a stored digital wallet user identifier, DC computing device 150 generates and transmits an authentication request message to VC computing device 116. The authentication request message includes a request to generate a confirmation code. The confirmation code may include various characters, such as a numeric, an alphabetic, an alphanumeric, a symbol, and the like. Upon receiving the authentication message, VC computing device 116 generates the confirmation code and transmits the code to a user computing device onboarded with VC computing device 116 and associated with user 222. The user computing device receives the code and displays the code to user 222, who then speaks the code to VC computing device 116.

If the code spoken by the user and the code transmitted to the user computing device by VC computing device 116 match, VC computing device 116 authenticates user 222 and transmits an authentication approval message to DC computing device 150. Upon receiving the authentication approval message, DC computing device 150 approves the registration of user 222 and VC computing device 116. If the code by the user and the code transmitted to the user computing device by VC computing device 116 do not match, VC computing device 116 does not authenticate user 222 and transmits an authentication denial message to DC computing device 150. Upon receiving the authentication denial message, DC computing device 150 denies the registration of user 222 and VC computing device 116.

In alternative embodiments, if DC computing device 150 determines that the digital wallet user identifier matches a stored digital wallet user identifier, DC computing device 150 approves the registration of user 222 and VC computing device 116, without requiring an authentication approval message from VC computing device 116. Upon approval of the registration, DC computing device 150 transmits an approval message to VC computing device 116. Once VC computing device 116 receives the approval message, VC computing device 116 transmits the approval message, via a speaker, to user 222.

In the example embodiment, if DC computing device 150 determines that the digital wallet user identifier does not match a stored digital wallet user identifier, DC computing device 150 denies the registration of user 222 and VC computing device 116, and transmits a denial message to VC computing device 116. Upon receiving the denial message, VC computing device 116 transmits, via a speaker, the denial message to user 222. In some embodiments, if DC computing device 150 determines that the digital wallet user identifier does not match a stored digital wallet user identifier, DC computing device 150 suspends the registration, and generates and transmits a resubmission message to VC computing device 116. The resubmission message may include a request for user 222 to resubmit the digital wallet user identifier. Once VC computing device 116 receives the resubmission message, VC computing device 116 transmits, via a speaker, the resubmission message to user 222, who may speak the digital wallet user identifier again.

After DC computing device 150 has onboarded user 222 and VC computing device 116, user 222 may register account numbers associated with merchants, such as merchants 224, in the VC payment service provided by DC computing device 150, via VC computing device 116. In the example embodiment, these merchants are generally payees, such as cable providers, utility providers, loan providers, and/or other merchants that user 222 may desire to make payments. In other embodiments, user 222 may register account numbers associated with user 222, natural persons, and/or non-merchant entities that user 222 may desire to transfer funds.

User 222 initiates the registration of the account numbers by speaking, for example, a predesignated word is recognized by the VC computing device and the skill code snippets running on the VC computing device. For example, user 222 may begin the payee registration process by making a statement, such as "VC computing device, add digital wallet payee." In this embodiment, the term "Add payee" activates VC computing device 116 to begin the process. VC computing device 116 may transmit, through a speaker, a response, such as "Welcome to digital wallet. You can add a payee." User 222 in return may state, "Add payee Gas Provider X." VC computing device 116 captures and stores the name of the merchant, "Gas Provider X." Subsequently, VC computing device 116 transmits, through the speaker, a question, such as "What is your Gas Provider X account number?" User 222 may respond "33-026303-33." In the example embodiment, VC computing device 116 repeats the inputted information and requests user 222 to confirm that the account number was properly onboarded to VC computing device 116. VC computing device 116 is configured to receive the confirmation from user 222 prior to transmitting the name of the merchant and the account number to DC computing device 150. Once VC computing device 116 receives the confirmation, VC computing device 116 transmits VC data, including the name of the merchant and the account number, to DC computing device 150.

DC computing device 150 is configured to receive the VC data and parse the VC data to at least identify the name of the merchant, the digital wallet identifier, and the account number. DC computing device 150 is also configured to use the name of the merchant and the account number to verify that they are associated with the user identifier corresponding to user 222 and the account number is associated with the name of the merchant. DC computing device 150 performs a look up for the name of the merchant in a database that includes names of merchants that are registered in the VC payment service. DC computing device 150 compares the name of the merchant to the names of merchants registered for the service. In one embodiment, if, based on the comparison, DC computing device 150 matches the name of the merchant to a name of a merchant registered in the service, DC computing device 150 stores within a database the matched name of the merchant and transmits the account number to the merchant associated with the matched name of the merchant. In response, the merchant may transmit an approval message to DC computing device 150 if the account number matches an account number in the merchant's database. If the account number does not match, the merchant may transmit a denial message to DC computing device 150.

If DC computing device 150 receives an approval message from the corresponding merchant, DC computing device 150 generates a confirmation code and transmits the confirmation code to VC computing device 116. VC computing device 116 performs a look up for a user computing device identifier and transmits the confirmation code to a user computing device associated with the user computing device identifier. Subsequently, the user computing device displays the received confirmation code, which user 222 reads to VC computing device 116. Conversely, if DC computing device 150 receives a denial message, DC computing device 150 may generate a message that may include the reason for denial (e.g., incorrect account number, incorrect merchant name, incorrect user name, or the like). In the example embodiment, VC computing device 116 receives the message and transmits, via the speaker, the reason for denial. For example, VC computing device 116 may transmit a message, such as "Gas Provider X was not added. Please enter the correct account number."

In another embodiment, if, based on the comparison, DC computing device 150 matches the name of the merchant to a name of a merchant registered in the service, DC computing device 150 accesses a merchant database where DC computing device 150 performs a look up for the account number. If the account number matches an account number in the merchant database, DC computing device 150 generates a confirmation code and transmits the confirmation code to VC computing device 116. VC computing device 116 performs a look up for a user computing device identifier and transmits the confirmation to a user computing device associated with the user computing device identifier. Subsequently, the user computing device displays the received confirmation code, which user 222 reads to VC computing device 116. Conversely, if DC computing device 150 does not match the account number to an account number in the merchant database, DC computing device 150 may generate a message that may include the reason for denial (e.g., incorrect account number, incorrect merchant name, incorrect user name, or the like). In the example embodiment, VC computing device 116 receives the message and transmits, via the speaker, the reason for denial. For example, VC computing device 116 may transmit a message, such as "Gas Provider X was not added. Please enter the correct account number."

Once DC computing device 150 has added and stored the merchant associated with the merchant name and the account number within the database in communication with DC computing device 150, DC computing device 150 is able to process payment transactions. For example, user 222 may begin a payment transaction by making a predesignated statement, such as "VC computing device, make digital wallet payment." In this embodiment, the terms "Make" and "Payment" activate VC computing device 116 to begin the payment transaction process. VC computing device 116 may transmit, through a speaker, a response, such as "Welcome to digital wallet. You can make a payment." User 222, in return, may state, "Make payment to Gas Provider X." VC computing device 116 captures the name of the merchant, "Gas Provider X." Subsequently, VC computing device 116 transmits, through the speaker, a question, such as "How much do you want to pay to Gas Provider X?" User 222 may respond "58 dollars and 24 cents." In the example embodiment, VC computing device 116 repeats the inputted amount and requests user 222 to confirm that the amount of the payment is correct. VC computing device 116 may make a statement, such as "I heard the amount as 58 dollars and 24 cents. Is that correct?" If user 222 states "Yes," VC computing device 116 is configured to generate a message including VC data, such as the name of the merchant, a user identifier, a VC computing device identifier, the account number associated with the merchant, the digital wallet identifier, and the payment amount. Subsequently, VC computing device 116 transmits the VC data and transaction data to DC computing device 150.

DC computing device 150 is configured to receive the transaction data and the VC data, and parse the transaction data and the VC data to at least identify the name of the merchant, the digital wallet identifier, and the account number. DC computing device 150 is also configured to use the name of the merchant and the account number to verify that they are associated with the user identifier corresponding to user 222 and the account number is associated with the name of the merchant. DC computing device 150 performs a look up for the name of the merchant in a database that includes names of merchants that are registered in the VC payment service. DC computing device 150 compares the name of the merchant to the names of merchants registered in the service. In one embodiment, if, based on the comparison, DC computing device 150 matches the name of the merchant to a name of a merchant registered in the service (e.g., a name of a merchant stored in the database) and the account number matches a stored account number, DC computing device 150 generates a confirmation code and transmits the confirmation code to VC computing device 116.

VC computing device 116 performs a look up for a user computing device identifier and transmits the confirmation code to a user computing device associated with the user computing device identifier. Subsequently, user computing device displays the received confirmation code to user 222 and user 222 reads the code to VC computing device 116. If the confirmation code read by user 222 matches the confirmation code received from DC computing device 150, VC computing device 116 generates an approval message confirming that the confirmation code matched. VC computing device 116 is also configured to transmit the approval message to DC computing device 150. DC computing device 150 receives the approval message and transmits the payment amount to the merchant. If the confirmation code read by user 222 does not match the confirmation code received from DC computing device 150, VC computing device 116 may request user 222 to read the confirmation code again. In some embodiments, VC computing device 116 is configured to request to user 222 to re-read the confirmation code a predefined number of times before VC computing device 116 generates a denial message (e.g., a no matching confirmation code message) and transmits that message to DC computing device 150. In other embodiments, VC computing device 116 is configured to request to user 222 to re-read the confirmation code an unlimited number of times.

FIG. 2 is a schematic diagram illustrating an example multi-party payment processing system 200 for onboarding users and exchanging data in real-time over a network using at least one voice controlled (VC) computing device. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

As described with respect to payment processing system 200, a financial institution called the "issuer" issues a transaction card or electronic payments account identifier, such as a credit card or debit card, to a consumer, cardholder, or user 222, who uses the transaction card to tender payment for a purchase from a merchant 224. To accept payment with the transaction card, merchant 224 must normally establish an account with a financial institution that is part of the financial payment system. This financial institution is usually called the "merchant bank," the "acquirer bank," or the "acquirer." When user 222 tenders payment for a purchase with a transaction card, merchant 224 requests authorization from an acquirer bank 226 for the amount of the purchase. The request may be performed over the telephone, but is usually performed through the use of a point-of-sale (POS) terminal or a computing device, which reads user's 222 account information from a magnetic stripe, a chip, or embossed characters on the transaction card and communicates electronically with the transaction processing computers of acquirer bank 226. Alternatively, acquirer bank 226 may authorize a third party to perform transaction processing on its behalf. In this case, the POS terminal will be configured to communicate with the third party. Such a third party is usually called a "merchant processor," an "acquiring processor," or a "third party processor."

Using an interchange network 228, computers of acquirer bank 226 or merchant processor will communicate with computers of an issuer bank 230 to determine whether user account 232 associated with user 222 is in good standing and whether the purchase is covered by user account 232 available credit line. Based on these determinations, the request for authorization will be declined or accepted. If the request is accepted, an authorization code is issued to merchant 224.

When a request for authorization is accepted, the available credit line of user account 232 is decreased. Normally, a charge for a payment card transaction is not posted immediately to user account 232 because bankcard associations, such as Mastercard International Incorporated®, have promulgated rules that do not allow merchant 224 to charge, or "capture," a transaction until goods are shipped or services are delivered. However, with respect to at least some debit card transactions, a charge may be posted at the time of the transaction. When merchant 224 ships or delivers the goods or services, merchant 224 captures the transaction by, for example, appropriate data entry procedures on the POS terminal. This may include bundling of approved transactions daily for standard retail purchases. If user 222 cancels a transaction before it is captured, a "void" is generated. If user 222 returns goods after the transaction has been captured, a "credit" is generated. Interchange network 228 and/or issuer bank 230 stores the transaction card information, such as a category of merchant, a merchant identifier, a location where the transaction was completed, amount of purchase, and date and time of the transaction in a database 120 (shown in FIG. 1).

After a purchase has been made, a clearing process occurs to transfer additional transaction data related to the purchase among the parties to the transaction, such as acquirer bank 226, interchange network 228, and issuer bank 230. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, user account 232 is decreased. Normally, a charge is posted immediately to user account 232. The payment card association then transmits the approval to the acquiring processor for distribution of goods/services or information, or cash in the case of an automated teller machine (ATM).

After a transaction is authorized and cleared, the transaction is settled among merchant 224, acquirer bank 226, and issuer bank 230. Settlement refers to the transfer of financial data or funds among acquirer bank 226, issuer bank 230, and merchant's 224 account related to the transaction. Usually, transactions are captured and accumulated into a "batch," which is settled as a group. More specifically, a transaction is typically settled between issuer bank 230 and interchange network 228, and then between interchange network 228 and acquirer bank 226, and then between acquirer bank 226 and merchant 224.

In some embodiments, user 222 registers one or more payment cards with a digital wallet. Having done this, user 222 can interact with a participating online merchant 224. At the check-out stage, online merchant 224 displays a button on the merchant website which user 222 can click on in order to make a payment using the user 222 digital wallet. Online merchant 224 then redirects user 222 to a "switch" operated by interchange network 228. Using a cookie located on a consumer computing device, the "switch" is able to determine which wallet-hosting server hosts a wallet associated with user 222. The switch then establishes a connection between the user computing device and the appropriate wallet-hosting system, which presents user 222 with a sign-in page (e.g., as a pop-up window), where there is an authentication process (e.g., entry of a pre-agreed password). This log-in process may use the same login credentials (e.g., password) which user 222 also uses to obtain access to other online banking activities.

The wallet-hosting system then securely transfers user 222 payment information to the online merchant's domain. The merchant's domain submits user's 222 payment information to acquirer bank 226 for a separate authorization process in which the acquiring domain communicates with the issuer bank 230 to ask the bank to authorize the transaction. Thus, user 222 is not required to enter their card details (except at the stage of initially registering with the wallet-hosting system), and the online transaction process is streamlined with only a single redirection, and consistent branding for the entire payment process, irrespective of the online merchant 224.

In some embodiments, a unique identifier is provided to user 222. The unique identifier is different from the number associated with user account 232. In these embodiments, interchange network 228 stores the unique identifier in database 120 along with user account 232. When interchange network 228 receives the unique identifier, interchange network 228 determines the associated user account 232 and uses that information in processing the payment transaction.

Figure 3:
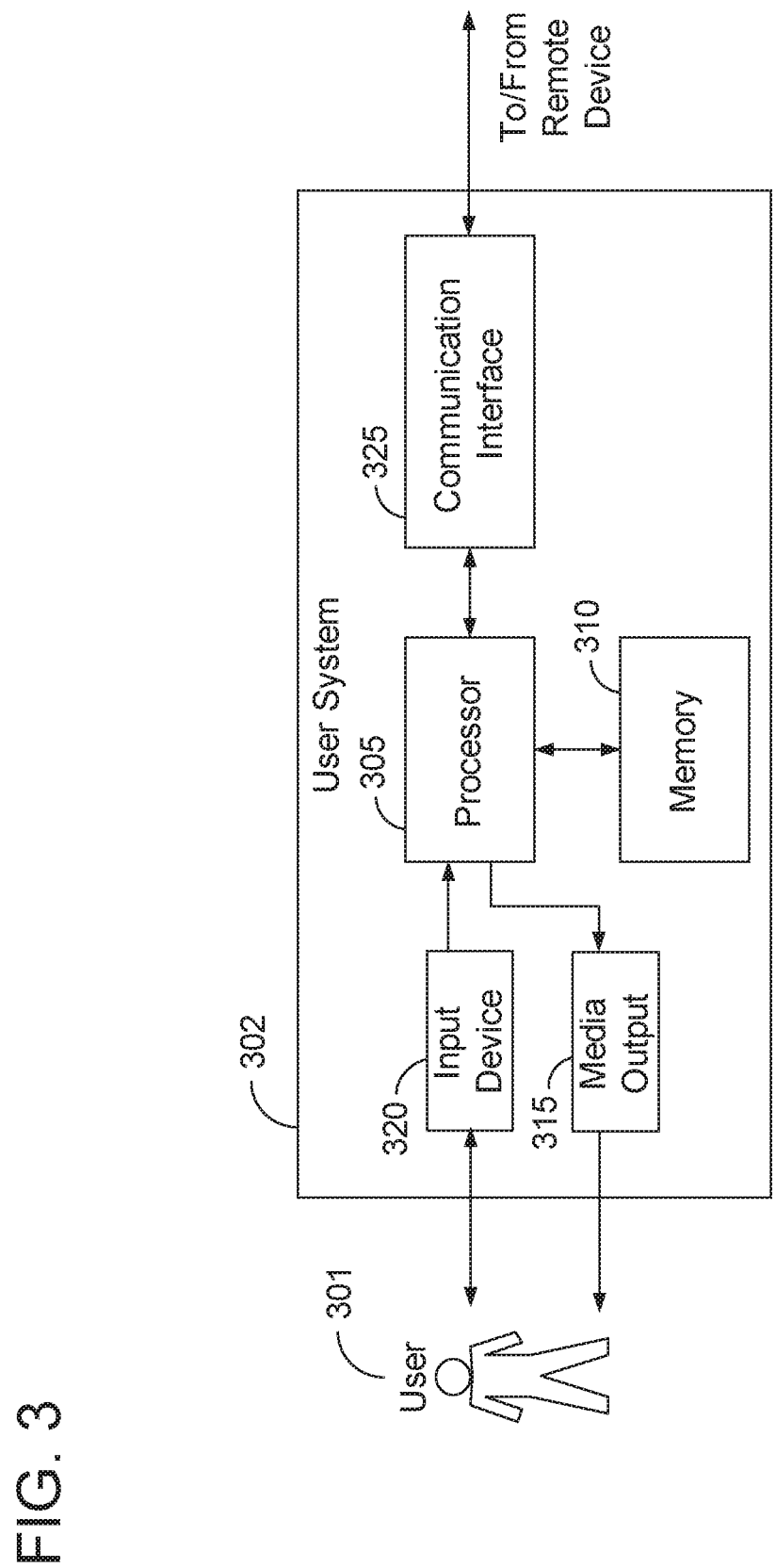

FIG. 3 illustrates an example configuration of a user system 302, such as client systems 114 (shown in FIG. 1) configured to transmit data to DC computing device 150 (shown in FIG. 1). User system 302 may include, but is not limited to, client systems 114. In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to user 301. User 301 may include, but is not limited to, user 222 (shown in FIG. 2). Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device, such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component, such as a touch screen, may function as both an output device of media output component 315 and input device 320. A single component, such as a touch screen, may function as both an output device of media output component 315 and input device 320. User system 302 may also include a communication interface 325, which is communicatively connectable to a remote device such as server system 112 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 301 via media output component 315 and, optionally, receiving and processing input from input device 320. A user interface may include, among other possibilities, a web browser, and a client application. Web browsers enable users, such as user 301, to display and interact with media and other information typically embedded on a web page or a website from server system 112. A client application allows user 301 to interact with a server application from server system 112.

Figure 4:
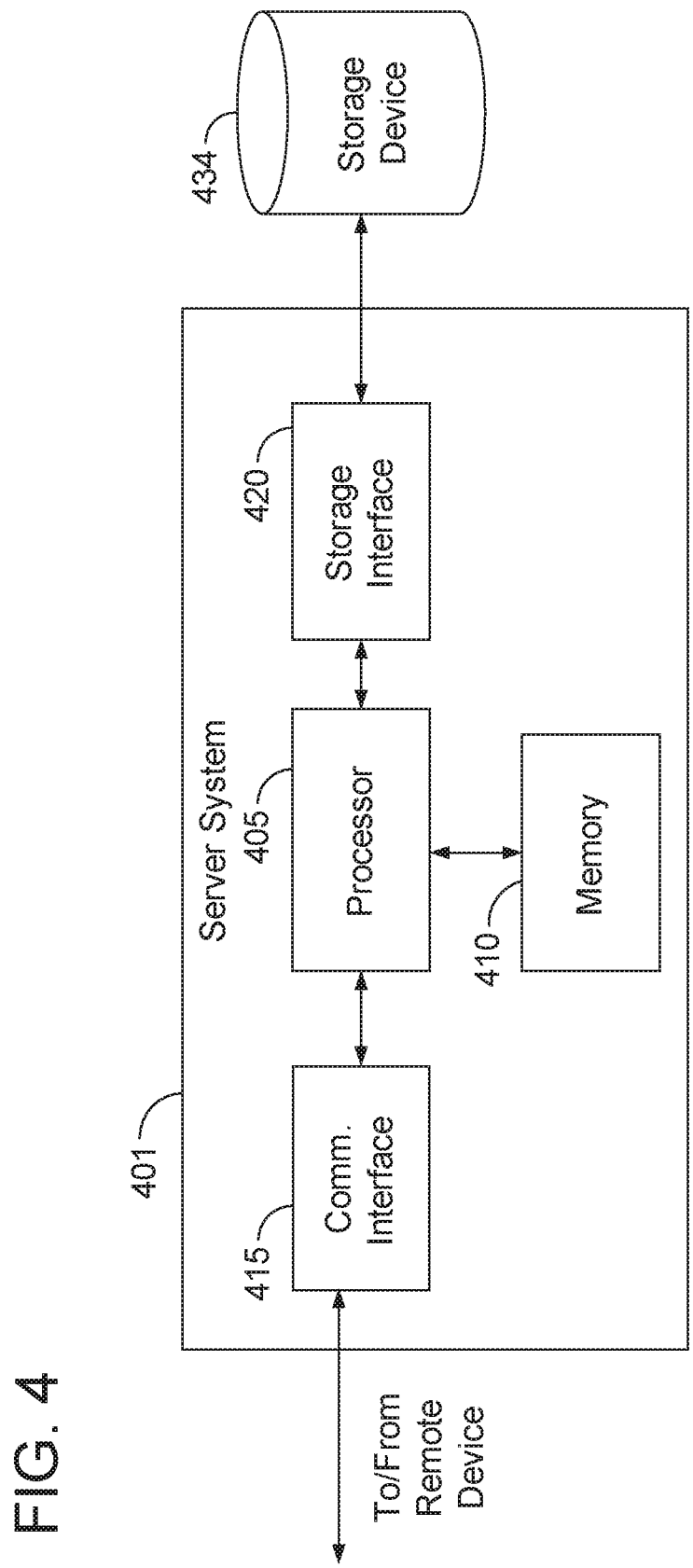

FIG. 4 illustrates an example configuration of a server system 401 such as the server system 112 (shown in FIG. 1) that includes DC computing device 150 (shown in FIG. 1). Server system 401 may include, but is not limited to, database server 118 (shown in FIG. 1) and/or DC computing device 150. In some embodiments, server system 401 is similar to server system 112.

Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from client systems 114 via a plurality of network connections, as illustrated in FIG. 1.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 120 (shown in FIG. 1). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
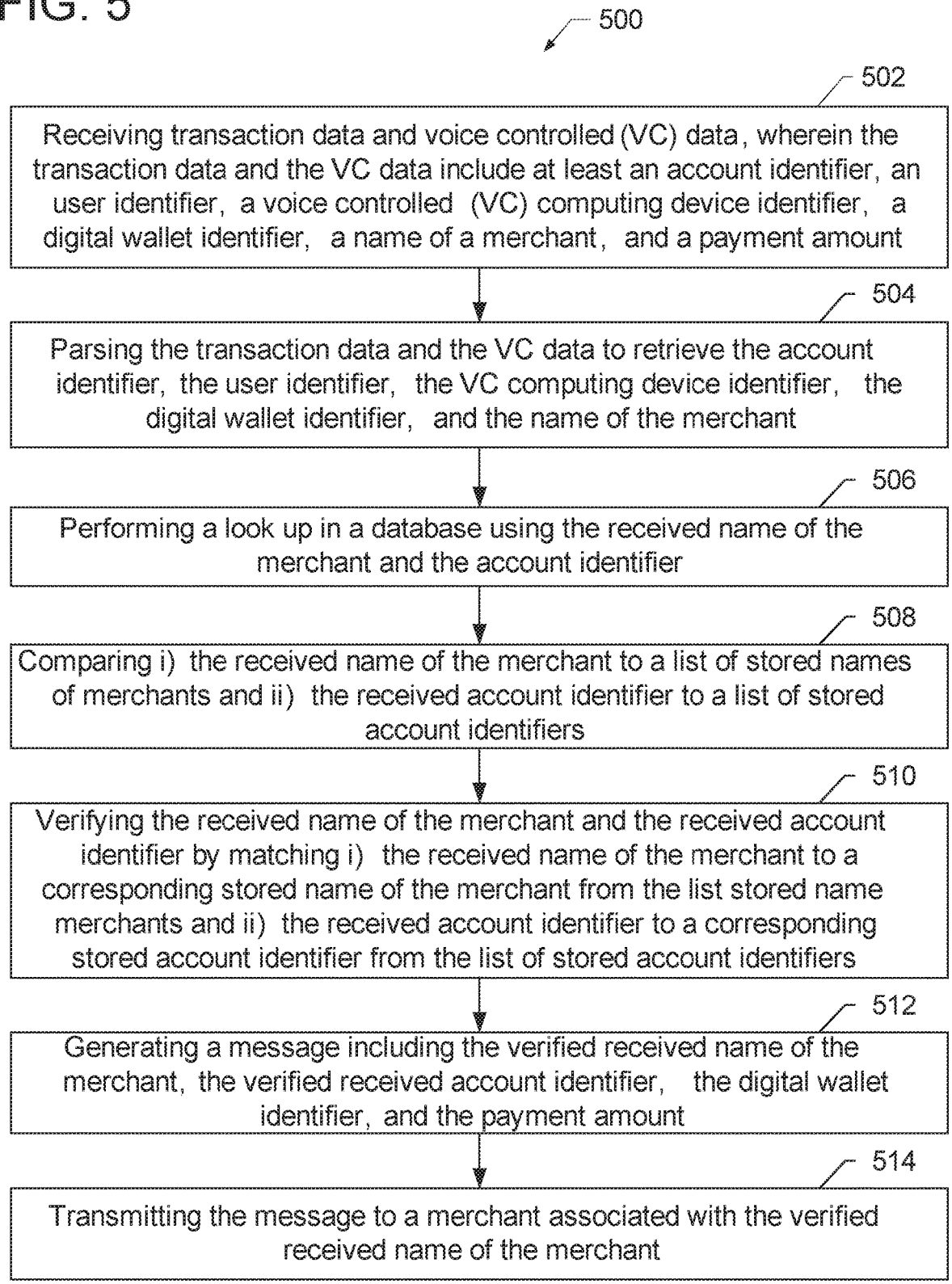

FIG. 5 is an example flow diagram illustrating a method flow 500 by which at least one DC computing device 150 (shown in FIG. 1) onboards users and exchanges data in real-time over a network using at least one voice controlled (VC) computing device. Method 500 includes receiving 502 transaction data and voice controlled (VC) data, wherein the transaction data and the VC data include at least an account identifier, a user identifier, a voice controlled (VC) computing device identifier, a digital wallet identifier, a name of a merchant, and a payment amount. Method 500 also includes parsing 504 the transaction data and the VC data to retrieve the account identifier, the user identifier, the VC computing device identifier, the digital wallet identifier, and the name of the merchant, performing 506 a look up in a database using the received name of the merchant and the account identifier, and comparing 508 i) the received name of the merchant to a list of stored names of merchants and ii) the received account identifier to a list of stored account identifiers. Method 500 further includes verifying 510 the received name of the merchant and the received account identifier by matching i) the received name of the merchant to a corresponding stored name of the merchant from the list stored name merchants and ii) the received account identifier to a corresponding stored account identifier from the list of stored account identifiers, generating 512 a message including the verified received name of the merchant, the verified received account identifier, the digital wallet identifier, and the payment amount, and transmitting 514 the message to a merchant associated with the verified received name of the merchant.

Figure 6:
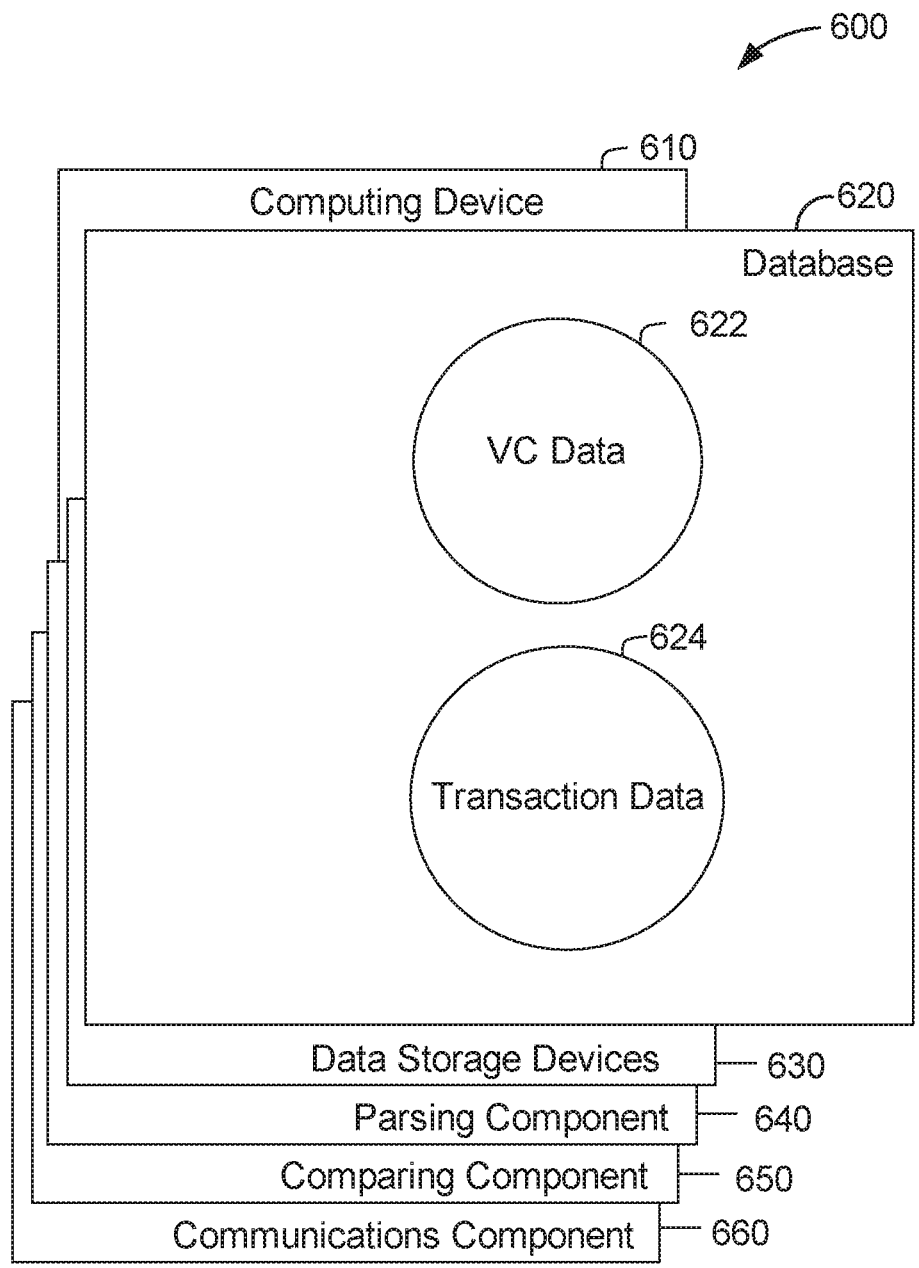

FIG. 6 is a diagram 600 of components of one or more example computing devices that may be used in VC system 100 shown in FIG. 1. In some embodiments, computing device 610 is similar to DC computing device 150 (shown in FIG. 1). Database 620 may be coupled with several separate components within computing device 610, which perform specific tasks. In this embodiment, database 620 includes VC data 622 and transaction data 624. In some embodiments, database 620 is similar to database 120 (shown in FIG. 1).

Computing device 610 includes database 620, as well as data storage devices 630 for storing data within database 620. Computing device 610 also includes a parsing component 640 for parsing 504 (shown in FIG. 5) the transaction data and the VC data to retrieve the account identifier, the user identifier, the VC computing device identifier, the digital wallet identifier, and the name of the merchant. Computing device 610 further includes comparing component 650 for comparing 508 (shown in FIG. 5) i) the name of the merchant to a corresponding stored name of the merchant and ii) the account identifier to a corresponding stored account identifier. Computing device 610 also includes communications component 660 for receiving 502 transaction data and voice controlled (VC) data and transmitting 514 (both shown in FIG. 5) the message to a merchant associated with the name of the merchant.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is enabling users to make payments in few seconds by having a short conversation with at least one VC computing device. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the DC computing device are described herein as including general processing and memory devices, it should be understood that the DC computing device is a specialized computer configured to perform the steps described herein for onboarding users and exchanging data in real-time.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A voice controlled (VC) system for onboarding users and exchanging data in real-time over a network comprising at least one data controller (DC) computing device, the at least one DC computing device in communication with a voice controlled (VC) computing device and comprising a processor communicatively coupled to a memory, the VC system configured to:
  transmit a skill code snippet to the VC computing device, the skill code snippet configured to enable communication and interaction between the VC computing device and the at least one DC computing device;
  receive, from the VC computing device, digital wallet information associated with a user of the VC computing device;
  register, in real-time relative to receiving the digital wallet information, the user and the VC computing device on the VC system by matching the received digital wallet information to stored digital wallet information of the user accessed via a digital wallet server in communication with the at least one DC computing device;
  receive transaction data and voice controlled (VC) data from the VC computing device via the transmitted skill code snippet, wherein the transaction data and the VC data include at least an account identifier associated with the user of the VC computing device, a user identifier associated with the user, a voice controlled (VC) computing device identifier associated with the VC computing device, a digital wallet identifier, a name of a merchant, and a payment amount of a payment;

parse the transaction data and the VC data to retrieve the account identifier, the user identifier, the VC computing device identifier, the digital wallet identifier, and the name of the merchant;

perform a look up, in a database, for the merchant using the received name of the merchant and the account identifier;

compare i) the received name of the merchant to a list of stored names of merchants and ii) the received account identifier to a list of stored account identifiers;

verify the received name of the merchant and the received account identifier by matching i) the received name of the merchant to a corresponding stored name of the merchant from the list of stored names of merchants and ii) the received account identifier to a corresponding stored account identifier from the list of stored account identifiers;

in response to verifying the received name of the merchant and the received account identifier, generate and transmit a confirmation code to the VC computing device, wherein the confirmation code causes the transmitted skill code snippet executing on the VC computing device to (i) perform a lookup for a user computing device identifier associated with a user computing device of the user and (ii) transmit the confirmation code to the user computing device upon finding the user computing device identifier;

receive, from the VC computing device via execution of the transmitted skill code snippet, an approval message including the payment amount, wherein the transmitted skill code snippet generates the approval message in response to confirming that the VC computing device received a voice confirmation code from the user matching the transmitted confirmation code; and transmit the approval message to the merchant to make the payment.

2. The VC system of claim 1 further configured to:
receive the VC data from the VC computing device;
store the VC data within the database of the at least one DC computing device based on the user identifier; and
generate a merchant profile associated with the merchant.

3. The VC system of claim 1 further configured to:
receive biometric data from the user computing device;
compare the biometric data to stored biometric data;
match the biometric data to the stored biometric data;
in response to matching the biometric data to the stored biometric data, generate a first confirmation code; and
transmit the first confirmation code to the user computing device.

4. The VC system of claim 3, wherein the first confirmation code includes a request to read at least one of an alphanumeric code, an alphabetic code, and a numeric code.

5. The VC system of claim 3, wherein the first confirmation code includes a request to provide additional biometric data.

6. The VC system of claim 4 further configured to:
receive, via an audio input device, a second confirmation code;
match the first confirmation code to the second confirmation code; and
in response to matching the first confirmation code to the second confirmation code, approve the user to perform payments via the VC computing device.

7. The VC system of claim 5 further configured to:
receive, via a biometric reader, a third confirmation code;
match the first confirmation code to the third confirmation code; and
in response to matching the first confirmation code to the third confirmation code, approve the user to perform payments via the VC computing device.

8. A computer-implemented method for onboarding users and exchanging data in real-time over a network, said method implemented using at least one data controller (DC) computing device in communication with a memory and a voice controlled (VC) computing device, said method comprising:

transmitting a skill code snippet to the VC computing device, the skill code snippet configured to enable communication and interaction between the VC computing device and the at least one DC computing device;

receiving, from the VC computing device, digital wallet information associated with a user of the VC computing device;

registering, in real-time relative to receiving the digital wallet information, the user and the VC computing device on the VC system by matching the received digital wallet information to stored digital wallet information of the user accessed via a digital wallet server in communication with the at least one DC computing device;

receiving transaction data and voice controlled (VC) data from the VC computing device via the transmitted skill code snippet, wherein the transaction data and the VC data include at least an account identifier associated with a user of the VC computing device, a user identifier associated with the user, a voice controlled (VC) computing device identifier associated with the VC computing device, a digital wallet identifier, a name of a merchant, and a payment amount of a payment;

parsing the transaction data and the VC data to retrieve the account identifier, the user identifier, the VC computing device identifier, the digital wallet identifier, and the name of the merchant;

performing a look up, in a database, for the merchant using the received name of the merchant and the account identifier;

comparing i) the received name of the merchant to a list of stored names of merchants and ii) the received account identifier to a list of stored account identifiers;

verifying the received name of the merchant and the received account identifier by matching i) the received name of the merchant to a corresponding stored name of the merchant from the list of stored name merchants and ii) the received account identifier to a corresponding stored account identifier from the list of stored account identifiers;

in response to verifying the received name of the merchant and the received account identifier, generating and transmitting a confirmation code to the VC computing device, wherein the confirmation code causes the transmitted skill code snippet executing on the VC computing device to i) perform a lookup for a user computing device identifier associated with a user computing device of the user and (ii) transmit the confirmation code to the user computing device upon finding the user computing device identifier;

receive, from the VC computing device via execution of the transmitted skill code snippet, an approval message including the payment amount, wherein the transmitted skill code snippet generates the approval message in response to confirming that the VC computing device received a voice confirmation code from the user matching the transmitted confirmation code; and transmitting the approval message to the merchant to make the payment.

9. The method of claim 8 further comprising:

receiving the VC data from the VC computing device;

storing the VC data within the database of the at least one DC computing device based on the user identifier; and generating a merchant profile associated with the merchant.

10. The method of claim 8 further comprising:

receiving biometric data from the user computing device;

comparing the biometric data to stored biometric data;

matching the biometric data to the stored biometric data;

in response to matching the biometric data to the stored biometric data, generating a first confirmation code; and transmitting the first confirmation code to the user computing device.

11. The method of claim 10, wherein the first confirmation code includes a request to read at least one of an alphanumeric code, an alphabetic code, and a numeric code.

12. The method of claim 10, wherein the first confirmation code includes a request to provide additional biometric data.

13. The method of claim 11 further comprising:

receiving, via an audio input device, a second confirmation code;

matching the first confirmation code to the second confirmation code; and in response to matching the first confirmation code to the second confirmation code, approving the user to perform payments via the VC computing device.

14. The method of claim 12 further comprising:

receiving, via a biometric reader, a third confirmation code;

matching the first confirmation code to the third confirmation code; and in response to matching the first confirmation code to the third confirmation code, approving the user to perform payments via the VC computing device.

15. A non-transitory computer-readable storage media having computer-executable instructions embodied thereon, wherein when executed by at least one data controller (DC) computing device in communication with a voice controlled (VC) computing device, the at least one DC computing device having at least one processor coupled to at least one memory device, the computer-executable instructions cause the at least one processor to:

transmit a skill code snippet to the VC computing device, the skill code snippet configured to enable communication and interaction between the VC computing device and the at least one DC computing device;

receive, from the VC computing device, digital wallet information associated with a user of the VC computing device;

register, in real-time relative to receiving the digital wallet information, the user and the VC computing device on the VC system by matching the received digital wallet information to stored digital wallet information of the user accessed via a digital wallet server in communication with the at least one DC computing device;

receive transaction data and voice controlled (VC) data from the VC computing device via the transmitted skill code snippet, wherein the transaction data and the VC data include at least an account identifier associated with a user of the VC computing device, a user identifier associated with the user, a voice controlled (VC) computing device identifier associated with the VC computing device, a digital wallet identifier, a name of a merchant, and a payment amount of a payment;

parse the transaction data and the VC data to retrieve the account identifier, the user identifier, the VC computing device identifier, the digital wallet identifier, and the name of the merchant;

perform a look up, in a database, for the merchant using the received name of the merchant and the account identifier;

compare i) the received name of the merchant to a list of stored names of merchants and ii) the received account identifier to a list of stored account identifiers;

verify the received name of the merchant and the received account identifier by matching i) the received name of the merchant to a corresponding stored name of the merchant from the list of stored name merchants and ii) the received account identifier to a corresponding stored account identifier from the list of stored account identifiers;

in response to verifying the received name of the merchant and the received account identifier, generate and transmit a confirmation code to the VC computing device, wherein the confirmation code causes the transmitted skill code snippet executing on the VC computing device to (i) perform a lookup for a user computing device identifier associated with a user computing device of the user and (ii) transmit the confirmation code to the user computing device upon finding the user computing device identifier;

receive, from the VC computing device via execution of the transmitted skill code snippet, an approval message including the payment amount, wherein the transmitted skill code snippet generates the approval message in response to confirming that the VC computing device received a voice confirmation code from the user matching the transmitted confirmation code; and transmit the approval message to the merchant to make the payment.

16. The computer-executable instructions of claim 15 further cause the at least one processor to:

receive the VC data from the VC computing device;

store the VC data within the database of the at least one DC computing device based on the user identifier; and generate a merchant profile associated with the merchant.

17. The computer-executable instructions of claim 15 further cause the at least one processor to:

receive biometric data from the user computing device;

compare the biometric data to stored biometric data;

match the biometric data to the stored biometric data;

in response to matching the biometric data to the stored biometric data, generate a first confirmation code; and transmit the first confirmation code to the user computing device.

18. The computer-executable instructions of claim 17, wherein the first confirmation code includes a request to read at least one of an alphanumeric code, an alphabetic code, and a numeric code.

19. The computer-executable instructions of claim 17, wherein the first confirmation code includes a request to provide additional biometric data.

20. The computer-executable instructions of claim 18 further cause the at least one processor to:

receive, via an audio input device, a second confirmation code;

match the first confirmation code to the second confirmation code; and in response to matching the first confirmation code to the second confirmation code, approve the user to perform payments via the VC computing device.

21. The computer-executable instructions of claim 19 further cause the at least one processor to:

receive, via a biometric reader, a third confirmation code;

match the first confirmation code to the third confirmation code; and in response to matching the first confirmation code to the third confirmation code, approve the user to perform payments via the VC computing device.

\* \* \* \* \*